July 15, 1958 E. KOTTSIEPER 2,843,211
AUTOMATIC TAIL ROTOR CONTROL
Filed Dec. 28, 1954 4 Sheets-Sheet 1

INVENTOR
EDWARD KOTTSIEPER
BY
ATTORNEY

INVENTOR
EDWARD KOTTSIEPER
BY M. B. Tasker
ATTORNEY

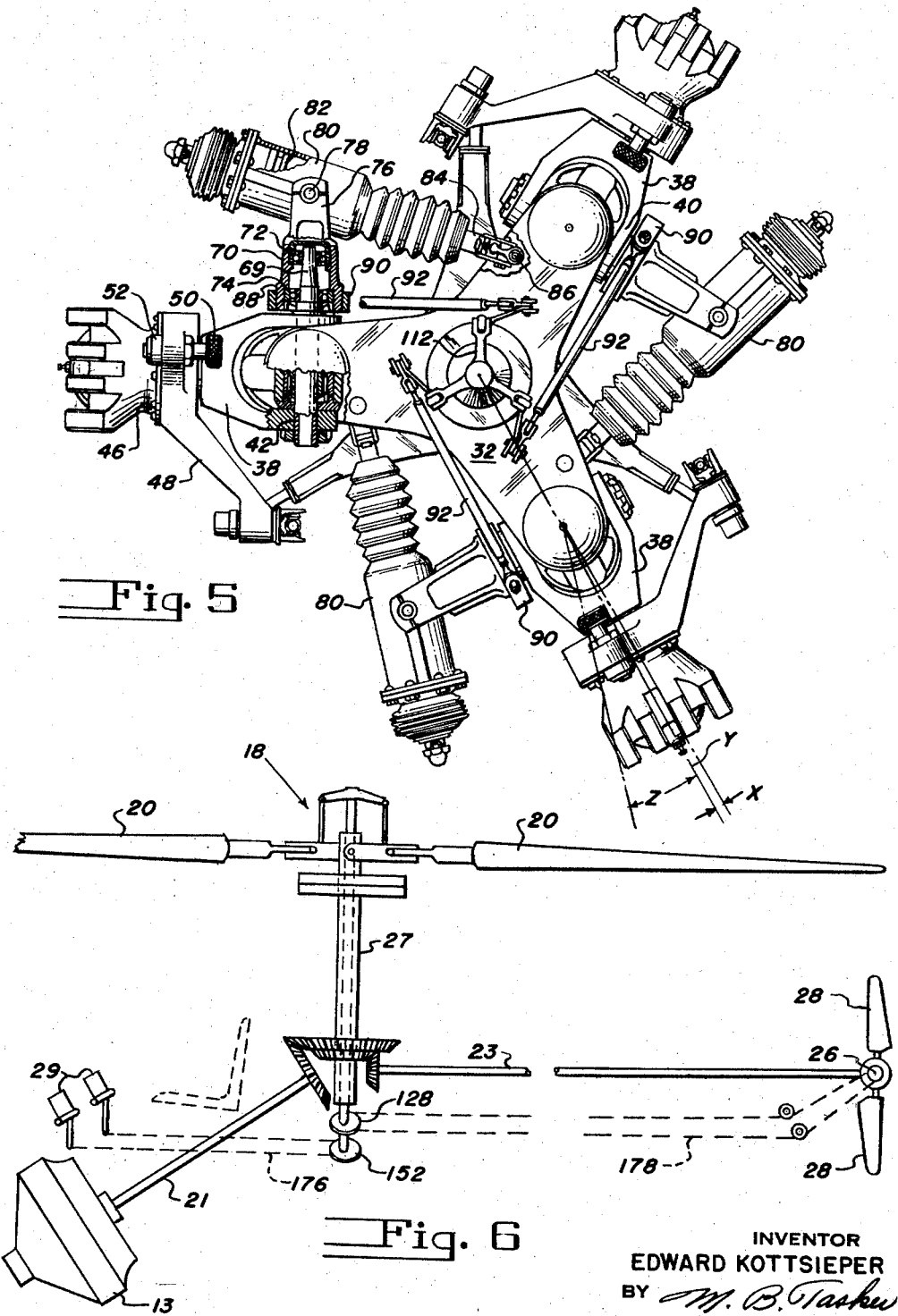

United States Patent Office 2,843,211
Patented July 15, 1958

2,843,211

AUTOMATIC TAIL ROTOR CONTROL

Edward Kottsieper, Fairfield, Conn., assignor to United Aircraft Corporation, East Hartford, Conn., a corporation of Delaware Application December 28, 1954, Serial No. 478,095

9 Claims. (Cl. 170—135.22)

This invention relates to rotary wing aircraft and particularly to helicopters of the type having a main sustaining rotor and an auxiliary tail rotor for compensating the torque of the main rotor. More specifically the invention relates to improved means for compensating the torque of the main rotor, to improved automatically operated means for controlling the pitch and thrust of torque compensating rotors, and to improved means for maintaining constant heading in helicopters as the torque of the main rotor varies during powered flight and during autorotative flight.

In helicopters of the type employing an anti-torque rotor aft of the main rotor, the pilot must constantly attend to the counterbalance of main rotor torque by adjustment of tail rotor pitch through his pedal controls. The control of a helicopter demands more continuous attention than does that of a fixed wing aircraft because the pitch of the main rotor blades and the engine throttle must be synchronized. This control becomes critical during a condition of in-flight power failure when the main rotor changes from high torque to autorotation within seconds. Under these conditions an abrupt and extensive application of pedal is required to maintain constant heading which, if minimized or eliminated, would enable the pilot's attention and energy to be devoted to other aspects of the emergency. Similarly, during normal or abrupt throttle changes the resultant main rotor torque requires compensating pedal application. It is well known that as main rotor pitch is increased, the helicopter will have a tendency to swing to the right or to the left, depending on the direction in which the rotor is turning, and this turning effect should be counteracted by additional pressure on the proper pedal to increase the tail rotor pitch. Furthermore, in prolonged maneuvers such as 360° turns while hovering, sideward flight, and hovering in a cross wind, full pedal travel may be required for sustained periods. Thus, it is desirable and is an object of this invention to provide automatic compensation of main rotor torque, particularly as required by the flight conditions enumerated above.

As is well known in the art of fully articulated rotors, the phenomenon of blade hunting about the drag hinges is related directly to main rotor torque. In normal forward flight hunting or periodic in-plane blade motion occurs but this is of the order of a few degrees. Variations of the mean lag angle of the blades from one flight condition to another with which this invention is concerned are much greater. For example, the sudden change from a condition of low R. P. M. and high power to autorotation might involve lag-lead angle change of the blades from plus 15° to minus 1° wherein the angle made by a blade forward of a radial line through the drag hinge and the rotor axis of rotation is negative (leading), and the angle made by a blade above radial position aft of said radial reference line is positive (lagging). Similarly, a flight change from autorotation to a condition of high R. P. M. and low power might involve a lag-lead change of from minus 1° to plus 12°.

It is a principal object of this invention to provide mechanism for changing tail rotor pitch in response to changes in the lag-lead angle of the main sustaining rotor blades resulting from changes in torque of the main rotor.

In a torque compensating device of this nature, aerodynamic hunting of individual blades resulting from blade flapping and drag variations must be considered, but must be cancelled out within the device. This hunting originates from periodically varying air forces in the plane of the rotor disc and periodically varying dynamic forces which are produced when a mass, such as a rotor blade, is rotated in a plane not perpendicular to its axis of rotation. When brought into play upon a sustaining rotor in normal forward flight, the movements above referred to produce individual blade hunting of small degree and periodic occurrence and it is another object of this invention to produce a mechanism for varying the pitch of the tail rotor blades in response to application of torque acting to affect the lag-lead angle of all of the main rotor blades simultaneously but which will cancel out and not vary the pitch of the tail rotor blades in response to the lag-lead movement of a single blade.

Another object of the invention is to provide improved means for automatic maintenance of heading under conditions of marked change of main rotor torque whereby the usual requirement for continuous pedal pressure is eliminated.

A further object of the invention is to provide means for automatically compensating main rotor torque while enabling the pilot to maintain control of the helicopter at all times by overriding the automatic torque compensating means by his pedal controls as the particular situation requires.

A further object of the invention is to provide simplified structure for obtaining automatic torque compensation for helicopters, or the like.

A further object of the invention is to prevent feedback into the pilot's pedals of forces caused by unbalance in the pitching moments of the tail rotor blades.

These and other objects and advantages of the invention will be pointed out hereinafter in the detailed description of a preferred embodiment of the invention shown in the accompanying drawings.

In these drawings,

Fig. 5 is a plan view of the rotor head of Fig. 2; and

Fig. 6 is a diagrammatic view showing a typical installation of the invention in a helicopter.

Figure 1:
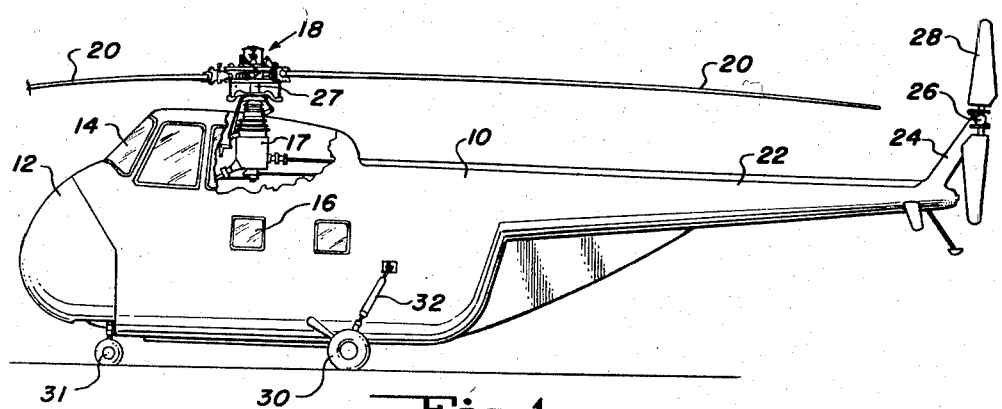
Fig. 1 is a side elevation of a helicopter embodying the invention, parts being broken away to facilitate illustration.

As shown in Fig. 1, the helicopter embodying this invention includes an elongated body 10 which contains a forward engine compartment 12 in which an engine 13 is installed (Fig. 6), an upper pilot compartment 14, and a cargo or passenger compartment 16. A main lifting rotor 18 is mounted for rotation about an upright axis in the body 10 and has articulated rotor blades 20, three blades being used in the helicopter illustrated.

The body 10 has a tail cone 22 projecting rearwardly therefrom which terminates in a pylon 24 supporting a tail rotor 26 rotatable about a transverse axis. The tail rotor has variable pitch blades 28 which are controllable from the pilot's compartment 14 by usual pilot's pedals 29 (Fig. 6) to compensate for main rotor torque and provide directional control of the helicopter. The helicopter is supported on main landing gear 30 provided with usual oleo struts 32 and on a pair of forward nose wheels 31.

Figure 2:
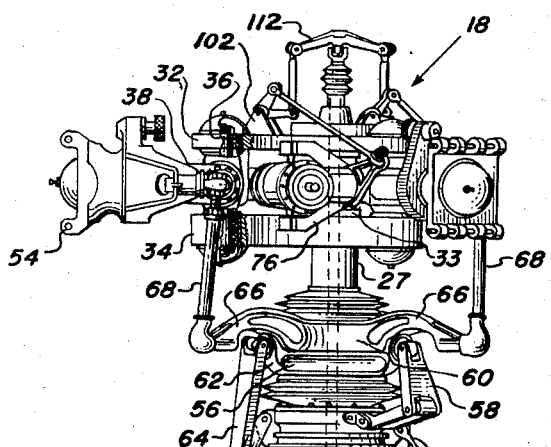
Fig. 2 is a view, on an enlarged scale, of the transmission and rotor head of the helicopter of Fig. 1, showing the main rotor torque responsive mechanism of the invention.

A main transmission housing 17 supports the rotor head 18 as generally indicated in Figs. 1 and 2 and is itself mounted on the helicopter body frame by tubular supports 19. Drive shaft 21 from the engine enters the housing 17 obliquely at the lower end thereof and a tail rotor drive shaft 23 extends aft more or less horizontally from said housing to the tail rotor 26 as shown in Fig. 6. The drive from the gear box to the rotor head is accomplished by means of a tubular upright drive shaft 27.

The drive shaft 27 has a spline connection 30a to a rotor rub in the form of a spool 33 which is bolted to and rigidly spaces upper and lower plates 32 and 34. These plates, as shown in Fig. 5, are star-shaped, having an arm for each blade of the rotor. The blades are pivoted on drag hinges 36 which are journalled in the plates 32 and 34 adjacent the extremities of the arms. Each blade has a flapping link 38 provided with bifurcations 40 which are fixed to a flapping hinge 42 journalled in the drag hinge 36. It will be noted that in this construction the flapping hinge 42 and the drag hinge 36 intersect. The blade 20 is attached to the flapping link 38 by means which provide for manual folding of the blade. To this end the flapping link has a radially extending feathering spindle on which the blade attaching sleeve 46 is journalled for rotation about its longitudinal axis to vary the pitch of the blade. Inboard of the blade attaching sleeve a blade pitching changing horn 48 is also journalled on the radially extending feathering spindle and is normally connected with sleeve 46 by slidable locking pin 50. It will be evident that when the pin 50 is retracted from the boss 52 which is connected to a flange on sleeve 46 the latter can be rotated freely on the spindle during the blade folding operation during which the blade is folded about one of the hinge pins 54 of the blade cuff folding hinge.

Control of the blade pitch both collectively and cyclically is obtained by means of a usual swashplate which is universally mounted on the drive shaft 27 for tilting movement in any direction to provide cyclic pitch control and is splined for movement up and down on the shaft for collective pitch control. The swashplate includes the usual nonrotative swashplate member 56 held against rotation by a scissors 58 connected between it and the gear box 17 and a rotatable swashplate member 60 which is connected by a similar scissors (not shown) to the drive shaft 27, the two swashplate members being connected by a suitable bearing.

The nonrotatable swashplate member 56 has four lugs 62 which are equally spaced about its periphery. The scissors 58 is connected to one of these lugs and suitable links 64 are connected to each of the other lugs which may be operated either individually or collectively from the pilot's controls to provide cyclic pitch control or collective pitch control in a well known manner.

The rotatable swashplate member 60 has three equally spaced arms 66 which are universally connected at their lower ends to thrust rods 68 which are in turn connected at their upper ends to the extremities of the blade horns 48.

It will thus be evident that if the swashplate is moved bodily up and down on the shaft 27 the pitch of all three of the blades will be changed simultaneously and equally whereas if one of the links 64 only is moved to tilt the swashplate the pitch of the blades will be changed cyclically as the blades rotate about the axis of shaft 27.

Means is also provided to control the movement in the plane of blade rotation of the flapping links 38 and their connected blades about the drag hinges 36. To this end the flapping hinge 42 is provided with a projecting end 69 which extends well beyond the flapping link 38 and on which a damper mounting sleeve 70 is journalled on bearings 72 and 74. The sleeve 70 has a yoke 76 at its extended end in the parallel arms of which trunnion pins 78 carried by the cylinder 80 of the usual hydraulic hinge dampers are journalled. The damper cylinder is thus bodily movable with the flapping link as the latter moves about the drag hinge 36 in the plane of rotation of the blade. Furthermore, this construction allows the blade to flap without moving the damper. The damper also includes the usual piston 82 and the piston rod 84, the inner end of which is connected by suitable pivot joint 86 to the hub structure between the upper and lower plates 32 and 34.

It will be evident that if torque from the engine 13 is applied to the drive shaft 29 the blades 20 will all lag about their drag hinges 36 and that as the blade pitch is increased and more power is applied to the shaft 27 the lag angle measured from a line $y$ intersecting the axis of rotation and the axis of the drag hinge will increase in proportion to the amount of torque applied to the drive shaft. This lag angle has been designated $z$ in Fig. 5. At the same time in normal flight a certain amount of movement between individual blades about their drag hinges occurs which may be due, for example, to aerodynamic forces. The mechanism of this invention is designed to apply correction to the pitch of the tail rotor in proportion to changes in lag-lead angle of the main rotor blades as a measure of torque applied to the drive shaft 27, this mechanism being capable of discriminating between changes in lag-lead angle of the blades resulting from an application of torque and variations of the lag-lead angle of an indivdual blade due to aerodynamic hunting and dynamic forces resulting from the rotation of the blades in planes out of the plane perpendicular to the drive axis.

As shown in Fig. 5, the damper supporting sleeve 70 has a straight land 88 on which a bracket arm 90 is rigidly secured, for example, by a set screw 91. A thrust rod 92 has one end universally connected to the extremity of arm 90 at 94 (Fig. 3) and has its other end pivotally connected at 96 to one arm 98 of a bell crank, the hub of which is journalled at 100 on a bifurcated bracket 102 mounted on the top of the upper plate 32. The other arm 104 of the bell crank has its free end pivotally connected at 106 to the lower end of a link 108, the upper end of which is pivoted at 110 to the extremity of one arm of a three arm star 112, the hub of which is universally connected at 114 to the upper end of a push-pull tube 116 reciprocable in the bore of the tubular drive shaft 27. Push-pull tube 116 carries external splines 118 which engage cooperating internal splines in a cap 120 threaded at 122 on the upper end of the drive shaft 27 so that the drive shaft and the push-pull tube rotate together. As is usual the upper spline and the push-pull tube 116 is protected by a boot 124 which extends from the tube 116 above the splined area to the upper end of the hood 120.

The movement of the push-pull tube 116 is utilized to change the pitch of the tail rotor blades as will hereinafter be fully described. At this point it will be evident that since all movements of each of the three blades about its drag hinge are transmitted through the linkage above described to one arm of the star 112 any movement of an individual blade about its drag hinge will cause the star to pivot about the points 110 connected with the other two blades. Since these individual blade hunting movements are very small and there is some lost motion in the linkage, no significant movement of the tube 116 will take place. However, when all of the blades move about their drag hinges in unison as a result of a change in the application of torque to the drive shaft 27 the star 112 will move bodily to vertically reciprocate the tube 116 and adjust the tail rotor pitch control mechanism which will be described hereinafter. The push-pull tube 116 is formed of two parts, a smaller diameter lower part 116a and an upper part 116b into the lower end of which the upper end of part 116a is telescopically received. The telescoping ends of the parts are supported within the bore of the drive shaft 27 by a ball bearing 126 which provides lateral support for the tube while also permitting the upper tube part 116b to rotate with the main rotor drive shaft 27 relative to lower part 116a. Bearing 126 also permits lower part 116a of the tube to rotate relative to the upper portion 116b for a purpose which will be later explained. The bearing 126 while allowing relative rotation of parts 116a and 116b is nevertheless designed to transmit axial thrust. To this end the outer bearing race is received in a socket in the lower end of part 116b and is held seated in the socket by an externally threaded nut 117. The lower part 116a is fixed in the inner bearing race by a nut 117a.

Figure 4:
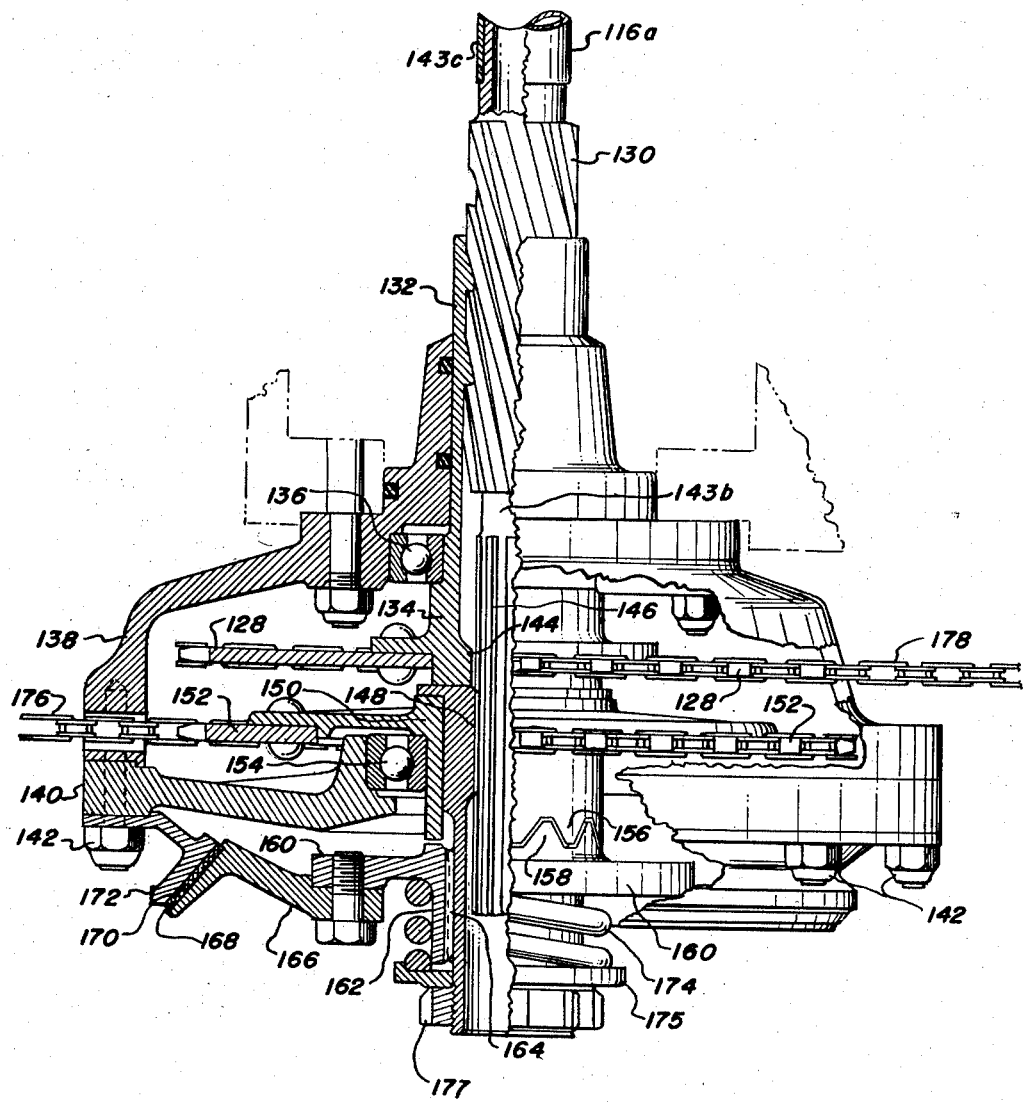
Fig. 4 is an enlarged view of the differential mechanism of Fig. 3.

The vertical reciprocations of tube 116 are translated into rotary movement of a sprocket 128 by means of a spirally splined portion 130 adjacent the lower end of tube part 116a meshing with a corresponding internally splined sleeve 132 which forms the hub 134 of the sprocket 128 as seen best in Fig. 4. Sleeve 132 is journalled on a bearing 136 in the upper half 138 of a differential housing, the lower complemental half 140 of which is secured thereto by a series of bolts 142. The lower end of spirally threaded sleeve 132 has an inwardly directed flange 144 which encloses but does not rest upon the tops of splines 146 of a lower splined portion of tube part 116a. Herein tube part 116a is built up of upper bearing attached element 143a and lower machined element 143b connected by tube 143c which act as a unit and hence has been referred to for convenience as the lower tube part 116a of push-pull tube 116.

In order that the reciprocating motion of spirally threaded portion 130 may be translated into rotary motion of sprocket 128, means are provided for normally holding the lower splined end of tube 116a against rotation. To this end an internally splined sleeve 148 is provided to cooperate with splines 146. Sleeve 148 has journalled thereon the hub 150 of a sprocket wheel 152, a bearing 154 being provided in the lower housing member 140 to support hub 150. Hub 150 is formed with a depending flange terminating in a plurality of cam teeth 156 which mate with matching teeth 158 on an annular upstanding flange of a plate member 160. Member 160 has a depending sleeve 162 which is internally splined to receive external splines 164 on the lower end of sleeve 148. Member 160 has bolted thereto an annular ring member 166 terminating in an oblique face carrying a band of friction material 168 which may engage the oblique face 170 of an annular brake drum 172 secured to the differential casing beneath plate 140 by the bolts 142. A compression spring 174 surrounds the sleeve 162, bearing at one end against the under side of plate 160 and at its other end against a washer 175 which is adjustably supported on the lower end of sleeve 148 by a nut 177. The spring 174 thus constantly urges the teeth 158 of plate 160 upwardly into meshing engagement with teeth 156. The mating teeth 156, 158 are, however, designed to have inclined faces which have a very loose fit when the brake is in engagement as shown in Fig. 4. Consequently, the pressure of the spring 174 is exerted, not against teeth 156, but against the brake drum 172 to prevent rotation of lower push-pull tube 116a as the latter is reciprocated. Sprocket wheel 152 seen in Fig. 3 with the chain removed is driven by chain 176 which is connected to the pilot's pedals 29 in the usual manner so that by the depression of one or the other of the pedals 29 the sprocket will be rotated in one or the other direction of rotation.

Rotation of sprocket 128 controls the pitch of the tail rotor blades 28 by means of a usual chain 178 in a well known manner. A tail rotor pitch control mechanism of this type is shown in a copending application of Igor I. Sikorsky, Serial No. 411,375, assigned to the assignee of this application.

Figure 3:
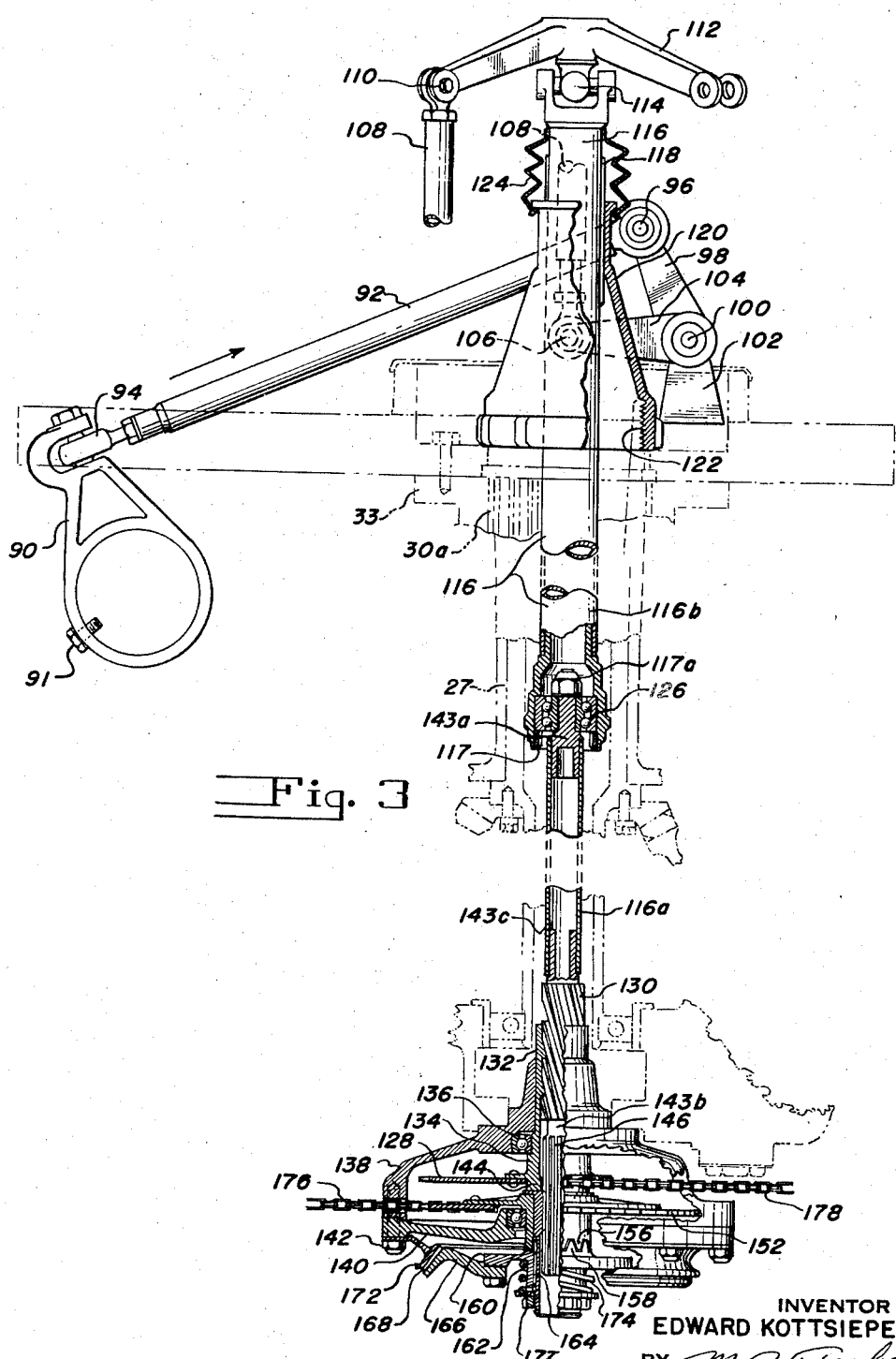
Fig. 3 is a still further enlarged view, partly in section, of the torque responsive mechanism of Fig. 2.

In operation, when the pilot, for example, causes more torque to be applied to the drive shaft 27 either by opening the throttle or by increasing the pitch of the main rotor blades, or both, all three of the blades 20 will drag back equally about their drag hinges 36 with the result that the three thrust rods 92 associated with the blades will be moved in the direction of the arrow shown in Fig. 3. This will be evident when it is considered that the bracket arms 90 are secured to the flapping hinge extensions 70 (Fig. 5) at a distance from the axes of the drag hinges 36.

Since under these conditions all of the blades lag back simultaneously and equally the star 112 will be raised bodily by links 108 under the action of bell crank arms 104 which will cause the push-pull tube 116 to be raised. Since the lower portion 116a of the push-pull tube is held against rotation by the normally engaged brake beneath the differential housing, bodily upward movement of spirally splined portion 130 will cause rotation of mating sleeve 132 and with its sprocket 128 to increase the pitch of the tail rotor blades and compensate for the increased main rotor torque.

A simultaneous decrease in the angle of lag of the three rotor blades will likewise result in a downward axial movement of tube 116 which is always free to move up and down due to its lower splined end which slides freely in sleeve 148. Such downward movement of push-pull tube 116 will obviously result in a reverse rotation of the sprocket wheel 128 to reduce the pitch of the tail rotor blades.

If the pilot wants to override this automatic mechanism above-described to change the heading of the helicopter or to trim the automatic heading control device he is always free to do so by depressing one or the other of pedals 29 without in any way interfering with the automatic operation above described.

This will be evident when it is considered that rotation of sprocket 152 through the medium of chain 176 connected to the pilot's pedals will initially cause the teeth 156 to cam the plate 160 downwardly as they act against the inclined faces of teeth 158, thus to release the brake. With the brake released the rotary motion imparted to sprocket 152 is then transmitted to plate 160 by the mating teeth 156, 158 which are still in engagement. Since sleeve 162 is splined to sleeve 164 and the latter is splined to the splines 146 on the lower end of tube 116a, the latter will now rotate with sprocket 152. This rotary movement is permitted by the presence of bearing 126 connecting the upper and lower parts 116b and 116a of the push-pull tube 116. This rotary movement of 116a is transmitted directly by the spirally threaded portion 130 to sleeve 132 and the sprocket 128 carried thereby to change the pitch of the tail rotor blades.

The automatic operation and the pilot controlled operation of the tail rotor pitch, above described, can thus be carried out simultaneously. While the lower push-pull portion 116a must be normally held against rotation by the brake in order for purely automatic operation it will be noted that if the brake is being held in disengaged position by reason of the depression of either one of the pilot's pedals the push-pull rod 116a is then as far as the automatic operation of the device is concerned, being held by the pilot and will operate as before. Thus, the controls by the automatic device and by the pilot are compatible but the pilot can always impose sufficient pedal control to take over the directional control of the helicopter.

From the above description it will be evident that means has been provided for automatically adjusting the pitch of the tail rotor blades to compensate for movements of the main rotor blades about their lag-lead hinges as a result of changes in torque of the main rotor.

It will also be evident that the mechanism of this invention will not respond to the normal hunting motions which take place by individual blades about their drag hinges, and that this automatic mechanism does not in any way interfere with the normal pilot's control of the tail rotor pitch by the use of his pedals.

From the above description it will also be clear that the mechanism of this invention will also prevent the feedback of vibratory movements from the tail rotor due to unbalanced pitching moments of the blades, since any forces originating in the tail rotor which tend to rotate the sprocket 128 will be stopped by the action of the brake. The brake prevents tube 116a from rotating and hence, because of the spirally threaded engagement between sleeve 132 and portion 130, locks the sprocket 128 against rotation except by axial reciprocation of 116a unless the pilot is actually applying pressure to one of his pedals when the initial movement of sprocket 152 releases the brake and allows the pilot to take control.

While I have shown and described a single illustrative embodiment of the invention, it will be understood that various changes may be made in the construction and arrangement of the parts without exceeding the scope of the invention.

I claim:

1. In a rotary wing aircraft, a main sustaining rotor having a plurality of blades mounted on drag hinges for lag-lead movements in the plane of blade rotation, an anti-torque rotor having variable pitch blades, means for varying the pitch of said blades to vary the thrust of said anti-torque rotor, mechanism operatively connecting the blades of said main and anti-torque rotors for automatically adjusting the pitch of the latter in response to lag-lead movements of said main rotor blades about their drag hinges due to changes in torque of said main rotor, said mechanism including a reciprocating member operatively connected to said pitch varying mechanism, a multi-armed star pivotally mounted on said member having an arm for each blade of said main rotor, and linkage means connecting one arm of said star to each blade of said main rotor at a point removed from the axis of its drag hinge.

2. In a rotary wing aircraft, an upstanding tubular drive shaft, a hub driven by said shaft, at least two blades mounted on said hub on drag hinges for pivotal movement in the plane of blade rotation, an anti-torque rotor having variable pitch blades, means for varying the thrust of said anti-torque rotor including means for varying the pitch of said blades, a push-pull member reciprocable in said drive shaft, a star pivotally mounted at the upper end of said member having at least two arms, means operatively connecting each arm of said star to a different blade of said main rotor at a point removed from its drag hinge, and means operatively connecting said member adjacent its lower end to said pitch varying means for oppositely adjusting the pitch of said anti-torque rotor blades in response to reciprocations of said member.

3. In a rotary wing aircraft, an upstanding tubular drive shaft, a hub driven by said shaft, at least two blades mounted on said hub on drag hinges for pivotal movement in the plane of blade rotation, an anti-torque rotor having variable pitch blades, means for varying the thrust of said anti-torque rotor including means for varying the pitch of said blades, a push-pull member reciprocable in said drive shaft, a star pivotally mounted at the upper end of said member having at least two arms, means operatively connecting each arm of said star to a different blade of said main rotor at a point removed from its drag hinge, means operatively connecting said member adjacent its lower end to said pitch varying means for oppositely adjusting the pitch of said anti-torque rotor blades in response to reciprocations of said member, and pilot operative means for adjusting said pitch varying means independently of the reciprocations of said push-pull member.

4. The combination recited in claim 2 in which the push-pull member is formed of upper and lower parts connected together at their adjacent ends for relative rotative movement.

5. The combination recited in claim 4 in which the means operatively connecting said member to said pitch varying means includes a spirally threaded portion on said member for changing axial movements of said member into rotary motion.

6. The combination recited in claim 5 in which the lower portion of said member carries a rotatable element having a splined connection to said member, and pilot operative means is provided for rotating said element to vary the pitch of said anti-torque rotor blades.

7. The combination recited in claim 6 in which brake means is provided for normally holding said member, and cam means is provided which is operated by initial movement of said element for releasing said brake means.

8. In a rotary wing aircraft, a main sustaining rotor having a plurality of blades mounted on drag hinges for lag-lead movements in the plane of blade rotation, said rotor being operatively connected to a hollow shaft, a tail rotor for counteracting the torque of said main rotor including means for varying tail rotor thrust, and means operated by movement of all of said main rotor blades in unison about their drag hinges for adjusting said thrust varying means, said last named means including a push-pull member extending through said hollow shaft, one end of said member being operatively connected to each blade and the other end of said member being operatively connected to said thrust varying means.

9. In a rotary wing aircraft, an upstanding tubular drive shaft, a hub driven by said shaft, at least two blades mounted on said hub on drag hinges for pivotal movement in the plane of blade rotation, an anti-torque rotor having variable pitch blades, means for varying the thrust of said anti-torque rotor including means for varying the pitch of said blades, a push-pull member reciprocable in said drive shaft, means operatively connecting one end of said push-pull member to each blade of said main rotor at a point removed from its drag hinge for movement of said push-pull member in response to movement of all of said main rotor blades about their drag hinges, and means operatively connecting said push-pull member adjacent its other end to said pitch varying means for adjusting the pitch of said anti-torque rotor blades in response to reciprocations of said member.

References Cited in the file of this patent

UNITED STATES PATENTS

| 2,364,096 | Platt | Dec. 5, 1944 |
| 2,432,677 | Platt | Dec. 16, 1947 |
| 2,499,161 | Pitcairn | Feb. 28, 1950 |
| 2,644,534 | Jensen | July 7, 1953 |